United States Patent [19]
Gibbs et al.

[11] Patent Number: 5,845,837
[45] Date of Patent: Dec. 8, 1998

[54] POLYMER-BASED MATERIAL FOR CARBON DEPOSITION DURING BRAZING OPERATIONS

[75] Inventors: Glen A. Gibbs, Warren; Tao Nie, Macomb Township; Robert M. Davie, Lapeer, all of Mich.

[73] Assignee: ITT Automotive, Inc., Auburn Hills, Mich.

[21] Appl. No.: 579,819

[22] Filed: Dec. 28, 1995

[51] Int. Cl.⁶ .................................................. B21C 37/06
[52] U.S. Cl. .............................. 228/143; 72/42; 228/56.3
[58] Field of Search .................................. 228/143, 56.3; 72/42; 428/663

[56] References Cited

U.S. PATENT DOCUMENTS

| | | |
|---|---|---|
| 1,431,368 | 10/1922 | Bundy . |
| 1,531,730 | 3/1925 | Bundy . |
| 1,537,404 | 5/1925 | Bundy . |
| 1,650,321 | 11/1927 | Bundy . |
| 1,685,269 | 9/1928 | Bundy . |
| 1,688,178 | 10/1928 | Drevitson . |
| 1,763,755 | 6/1930 | Bundy . |
| 1,827,381 | 10/1931 | Bundy . |
| 1,863,874 | 6/1932 | Quarnstrom . |
| 1,875,885 | 9/1932 | Quarnstrom . |
| 1,892,607 | 12/1932 | Bundy . |
| 1,895,133 | 1/1933 | Quarnstrom . |
| 1,896,371 | 2/1933 | Quarnstrom . |
| 1,909,501 | 5/1933 | Quarnstrom . |
| 1,930,191 | 10/1933 | Bundy . |
| 2,014,982 | 9/1935 | Quarnstrom . |
| 2,014,983 | 9/1935 | Quarnstrom . |
| 2,018,089 | 10/1935 | Quarnstrom . |
| 2,092,018 | 9/1937 | Quarnstrom ............................ 228/143 |
| 2,092,557 | 9/1937 | Quarnstrom ............................ 228/143 |
| 2,197,191 | 4/1940 | Nichols et al. . |
| 2,311,138 | 2/1943 | Swartz . |
| 2,373,116 | 4/1945 | Hobrock . |

(List continued on next page.)

FOREIGN PATENT DOCUMENTS

| | | |
|---|---|---|
| 46134 | 1/1987 | European Pat. Off. . |
| 0375039 | 6/1990 | European Pat. Off. . |

(List continued on next page.)

OTHER PUBLICATIONS

Metals Handbook Ninth Edition, vol. 3, pp. 16,17 Pipe, Tubes & Tubing Copyright 1980.

Metals Handbook Ninth Edition, vol. 1, pp. 557–559, Copyright 1978.

Marks'Standard Handbook for Mechanical Engineers, Eigth Edition pp. 6–36 through 6–38 Copyright 1978.

Metals Handbook Ninth Edition, vol. 6, pp. 1001–1013, "Brazing of Stainless Steels", Copyright 1983.

The Making, Shaping, & Treating of Steel, 8th Edition McGannon, Harold E. Ed, US Steel Corp. 1964, pp. 1111 to 1130.

Nichtrostende Stahle, 2nd Edition of the Deutsche Verein fur Eisenhultenleute, Publ in 1989 (p. 21, Fig. 2.07).

Primary Examiner—Kenneth J. Ramsey
Attorney, Agent, or Firm—Thomas N. Twomey

[57] ABSTRACT

A polymeric-based material for use in brazing operations to prevent agglomeration and run-off of brazing material on exterior exposed surfaces of the workpiece containing an extrudable melt-processible thermoplastic material selected from the group consisting of polyethylene, polypropylene, ethylene vinyl alcohol, nylon, and mixtures thereof; and up to about 20% by weight, based on the thermoplastic material, of an inert inorganic particulate material such as carbon or carbon black capable of at deposition on and adherence to an underlying metallic surface. In the process of the present invention, the polymeric-based material is imparted by any suitable means to the exterior or exposed surface of the workpiece to be brazed prior to exposure of the workpiece to a suitable fluxing atmosphere and temperature. In tube forming processes, the polymeric-based material is applied to the outer circumferential area of the formed unsealed tubing.

14 Claims, 1 Drawing Sheet

U.S. PATENT DOCUMENTS

| | | |
|---|---|---|
| 2,380,107 | 7/1945 | Hobrock . |
| 2,720,022 | 10/1955 | Snively . |
| 2,772,121 | 11/1956 | Meissner . |
| 2,996,799 | 8/1961 | Gaul . |
| 3,076,260 | 2/1963 | Roehl . |
| 3,077,661 | 2/1963 | Fromson ................................. 228/205 |
| 3,091,848 | 6/1963 | Frank . |
| 3,220,107 | 11/1965 | Clark . |
| 3,350,771 | 11/1967 | Durst . |
| 3,355,795 | 12/1967 | Clark . |
| 3,382,052 | 5/1968 | Clarke . |
| 3,389,455 | 6/1968 | Clark . |
| 3,400,449 | 9/1968 | Maguire et al. . |
| 3,417,453 | 12/1968 | Clarke . |
| 3,434,200 | 3/1969 | Russell . |
| 3,457,626 | 7/1969 | Coad . |
| 3,566,741 | 3/1971 | Sliney . |
| 3,610,290 | 10/1971 | Anderson et al. ...................... 138/143 |
| 3,741,266 | 6/1973 | Frailly . |
| 3,798,011 | 3/1974 | Sharp . |
| 3,992,303 | 11/1976 | Barker et al. ........................... 72/42 X |
| 4,016,008 | 4/1977 | Jones et al. . |
| 4,023,224 | 5/1977 | Frailly . |
| 4,052,323 | 10/1977 | Feneberger et al. . |
| 4,060,116 | 11/1977 | Frailly . |
| 4,294,395 | 10/1981 | Nayar ..................................... 228/220 |
| 4,505,232 | 3/1985 | Usami et al. . |
| 4,593,446 | 6/1986 | Hayner . |
| 4,758,358 | 7/1988 | Lum et al. . |
| 4,943,489 | 7/1990 | Kuhara et al. . |
| 5,042,710 | 8/1991 | Siemers et al. . |
| 5,069,381 | 12/1991 | Gibbs et al. . |
| 5,145,103 | 9/1992 | Johnson ................................. 228/143 |
| 5,191,779 | 3/1993 | Imazu et al. . |
| 5,222,652 | 6/1993 | Gibbs ..................................... 228/143 |
| 5,265,793 | 11/1993 | Usui et al. ............................. 228/127 |
| 5,297,410 | 3/1994 | Goff . |
| 5,297,587 | 3/1994 | Johnson ................................. 228/143 |
| 5,447,179 | 9/1995 | Gibbs ..................................... 138/143 |
| 5,468,401 | 11/1995 | Lum et al. ............................. 72/42 X |

FOREIGN PATENT DOCUMENTS

| | | |
|---|---|---|
| 2327318 | 3/1974 | France . |
| 2839684 | 11/1979 | Germany . |
| 2828960 | 1/1980 | Germany . |
| 4010178 | 6/1991 | Germany . |
| 1020061 | 2/1976 | Japan . |
| 2030755 | 3/1977 | Japan . |
| 53-0033304 | 9/1978 | Japan . |
| 119244 | 10/1978 | Japan . |
| 54-118361 | 9/1979 | Japan . |
| 48419 | 4/1980 | Japan . |
| 992599 | 1/1983 | U.S.S.R. . |
| 1238930 | 6/1986 | U.S.S.R. . |
| 354154 | 8/1931 | United Kingdom . |
| 359731 | 10/1931 | United Kingdom . |
| 384154 | 12/1932 | United Kingdom . |
| 510688 | 10/1937 | United Kingdom . |
| 1165159 | 9/1969 | United Kingdom ................... 228/143 |
| 2039808 | 8/1980 | United Kingdom . |
| 2045137 | 10/1980 | United Kingdom . |
| 2057313 | 4/1981 | United Kingdom . |
| 2241185 | 8/1991 | United Kingdom . |

FIG-1

FIG-2

POLYMER-BASED MATERIAL FOR CARBON DEPOSITION DURING BRAZING OPERATIONS

BACKGROUND OF THE INVENTION

1. Field of the Invention

This invention relates to brazing operations, particularly those relating to manufacture of double-wall tubes. More particularly this invention relates to a material suitable for use as an aid in brazing operations to prevent unwanted agglomeration and pooling of brazing material on exposed surfaces of the brazed workpiece. Even more particularly, this invention related to a material which can be employed as a substitute for solvent-based black paint containing elemental carbon or carbon black.

2. Discussion of Relevant Art

Various manufacturing operations employ brazing as the desired method of metal surface joining for reasons of economy, durability and the like. Brazing methods are not without drawbacks however. For example, safety standards in the automotive industry dictate that critical elements such as automotive brake lines be resistant to leakage, puncture and corrosion. In order to achieve these objectives, double-wall tubes for brake lines have been adopted as the industry standard. Such double-wall tubes consist of at least two thicknesses of a breakage-resistant metal material having sufficient properties to withstand fatigue due to prolonged vibration. The double walls of the tube employed in automotive vehicles are joined in such a manner to eliminate the possibility of leakage at any joined seam. Brazing has been found to be the most effective metal joining operation. In typical tubing manufacture operations, a suitable brazing material such as copper or various copper alloys is plated over the surface of a material such as carbon steel in either sheet or strip form prior to tubing formation to permit the ultimate formation of a leak-resistant joint.

In conventional operations, the plated brazing material tends to agglomerate or pool on the exterior surface of the double-wall tube when the tube is subjected to the high temperatures necessary to achieve metallurgical brazing. This agglomeration phenomenon can interfere with the close tolerance conditions required for the finished product. Additionally the agglomeration and pooling of the excess material is not aesthetically pleasing.

In order to prevent agglomeration, it has been necessary to apply one of a variety of solvent-based black paint products over the formed tube before the brazing operation. The solvent-based black paint typically contains elemental carbon or a suitably inert material such as carbon black which remains as a residue on the surface of the workpiece after the organic components of the solvent-based paint have been volatilized during the brazing process.

Use of carbon-containing black paint in this manner is costly and hazardous. Exposure to the elevated temperatures at which brazing occurs causes the solvent and volatile portions of black carbon-containing paint to volatilize generating a host of volatile organic compounds (VOC) which must be handled in an appropriate manner. Various volatilized materials deposit and accumulate in and on various components of the brazing furnace which can impair the operational efficiency of the brazing furnace. For instance muffle furnace tubes must be cleaned of organic deposits from black paint components routinely to maintain optimum performance. The rigorous cleaning schedule reduces the life of furnace muffle tubes necessitating their frequent replacement.

Conventional procedures also result in high paint and thinner usage. Additional difficulties exist in hazardous waste handling and disposal and as well as the associated issues pertaining to worker exposure and safety.

Thus, it would be desirable to provide a material which could be used to coat workpieces prior to brazing operations in place of solvent-based black paint containing carbon which is capable of preventing or reducing agglomeration and run off of the brazing materials such as copper or copper-containing alloys. It is also desirable to provide a material which could be used as a carrier to impart carbon over a brazing material which would break down at brazing temperatures and result in various volatilization by-product materials, at least some of which may be consumed in the atmosphere present in the brazing furnace environment. It is desirable to provide a process for producing brazed workpieces which employs the polymeric material of the present invention to reduce or eliminate the occurrence of agglomeration or run-off of brazing material present on exposed surfaces. It is also desirable to provide a brazing process in which at least some of the undesirable volatile organic components generated during conventional brazing operations using black paint are reduced or eliminated.

SUMMARY OF THE INVENTION

The present invention is a polymeric-based material for use in brazing operations and a brazing method employing the same. The polymeric-based material consists essentially of:

an extrudable melt-processible thermoplastic material selected from the group consisting of polyethylene, polypropylene, ethylene vinyl alcohol, nylon, and mixtures thereof; and up to about 20% by weight, based on the thermoplastic material, of an inert inorganic particulate material capable of deposition on and adherence to an underlying metallic surface. The inert inorganic material is, preferably, selected from the group consisting of carbon, carbon black, and mixtures thereof.

In the process of the present invention, the polymeric-based material is imparted by any suitable means to the exterior or exposed surface of the workpiece to be brazed prior to exposure of the workpiece to the fluxing atmosphere and temperature. In tube forming processes, the polymeric-based material is applied to the outer circumferential area of the formed unsealed tubing in any suitable manner, i.e. by cross-head extrusion operations. The applied polymeric material is allowed to cool and solidify after which, the coated workpiece is introduced into a suitable gaseous brazing atmosphere and exposed to an elevated temperature sufficient to support metallurgical brazing.

In the process of the present invention, the polymeric-based material in the coating is volatilized leaving residual carbon on the workpiece for the remainder of the brazing process. The elevated temperature necessary to support brazing triggers the chemical pyrolysis of the polymeric-based material in the coating yielding various volatile short-chain hydrocarbon molecules, as well as gaseous hydrogen and the like. The volatilized pyrolysis products may be further consumed in the brazing atmosphere or can be dealt with in other suitable manners.

The present invention also includes an unbrazed workpiece comprising a first metallic substrate material; a second metallic brazing material overlaying and adhering to the first metallic substrate material, the second metallic brazing material capable of forming a fusion bond with the first metallic substrate material; and a polymeric-based material consisting essentially of an extrudable melt-processible thermoplastic material selected from the group consisting of polyethylene, polypropylene, ethylene vinyl alcohol, nylon, and mixtures thereof; and up to about 20% by weight, based on the thermoplastic material, of an inert inorganic particulate material capable of deposition on and adherence to the second metallic brazing material.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

The present invention is predicated on the unexpected discovery that polymeric material which optionally contains an inert particulate material can provide an effective substitute for conventional solvent-based black paint. In the present invention polymeric material is place in an overlying relationship to a metallic surface with a suitable brazing material thereon and, as a result of pyrolysis at brazing temperatures, can impart a particulate film or coating which can effectively prevent or minimize the agglomeration or run-off of brazing material on the exposed surface of the workpiece being brazed.

The present invention encompasses polymeric-based coating which can be imparted on the surface of the workpiece prior to brazing to prevent agglomeration and run off of brazing material during the brazing process. The polymeric-based coating consists essentially of:

an extrudable melt-processible thermoplastic material selected from the group consisting of polyolefin resins such as polyethylene and polypropylene, polyesters, ethylene vinyl alcohols, polyamides, acetal resins, and mixtures thereof; and up to 20% by weight, based on the weight of the extrudable thermoplastic material, of an inert particulate material capable of deposition on and adherence to the underlying metal surface. The particulate material is, preferably, selected from the group consisting of carbon, carbon black, and mixtures thereof.

The thermoplastic material employed in the polymeric-based carrier system of the present invention is, preferably an extrudable melt processible material having a melt processing temperature in typical extrusion processing ranges. Suitable polymeric materials are capable of adhering to an underlying metal surface either by mechanical means, chemical means or a combination of the two. The metal-to-polymer adhesion is sufficient to maintain contact between the polymeric material and the underlying metallic surface for an interval sufficient to transfer the coated tube from suitable extrusion devices to a suitable brazing furnace.

The polymeric material of choice has a molecular structure made up of carbon atoms, hydrogen atoms, and, optionally, oxygen atoms and nitrogen atoms. The polymeric material is one which can be successfully applied to the tubing surface in a manner which will permit sufficient adhesion until and during brazing operations. Various application methods including, but not limited to, dipping, spraying, and extrusion are contemplated to be within the purview of the present invention. In the embodiment present herein, cross-head extrusion application methods are preferred.

Suitable polymeric materials which can be employed in the polymeric-based system of the present invention include extrusion grade polyolefin thermoplastic resins capable of maintaining structural adhesion characteristics and integrity when extruded as a thin film of less than 250 microns (0.010 inches). Suitable material is widely available from a variety of commercial sources. Polyolefin thermoplastic resins suitable for use in the coating material of the present invention generally have a density between about 0.090 g/cm$^3$ and about 1.18 g/cm$^3$; an elongation at break between about 480% and 1000%. The polyolefin resin of choice can be employed alone or in combination with other polymeric materials outlined herein.

The polymeric material can also be a melt-processible thermoplastic polyethylene material. Materials commonly referred to as either high density polyethylene or low density polyethylene can be successfully employed in the present invention. Suitable polyethylene materials are commercially available from a wide variety of sources. Suitable materials generally classified as either low density polyethylene or high density polyethylene can have the exemplary characteristics set forth in Table I.

TABLE I

| Typical Characteristics of Suitable Low Density and High Density Polyethylene Materials | |
|---|---|
| Low density | |
| Density (g/cm) | 0.910 to 0.925 |
| Crystal Melt Temperature (°C.) | 95 to 130 |
| Tensile Strength M Pa | 4.1 to 15.9 |
| Tensile Modulus M Pa | 96.5 to 260 |
| Elongation at break % | 90 to 800 |
| Hardness Shore D | 41 to 50 |
| High density | |
| Density (g/cm) | 0.941 to 0.965 |
| Crystal Melt Temperature (°C.) | 120 to 140 |
| Tensile Strength M Pa | 21.4 to 37.9 |
| Tensile Modulus M Pa | 414 to 1250 |
| Elongation at break % | 20 to 1300 |
| Hardness Shore D | 50 to 70 |

Polypropylene materials suitable for use in the carrier system of the present invention are thermoplastic melt processible materials which are conventionally suitable for use in conjunction with extrusion processes. Suitable materials are commercially available from a wide variety of sources. Exemplary characteristics include, but are not limited to, a processing temperature between about 205° C. and about 221° C.; density between about 0.895 and about 1.10 g/cm$^3$; an elongation at break between about 200% and about 500%.

Suitable acetal resin materials which can be employed in the composition of the present invention can include both the acetal homopolymeric compound as well as the copolymeric compound. Suitable homopolymeric materials are represented by materials marketed under the tradename DELRIN by DuPont which is characterized by a specific gravity of 1.42; a rockwell hardness of 94; and an elongation at break of 23 to 75%. Suitable copolymeric materials are represented by materials marketed under the tradename CELCON by Celanese which is characterized by a specific gravity of 1.41; a rockwell hardness of 80; and an elongation at break of 40 to 75%. Acetal resin materials are also commercially available from various other sources.

Polyester materials which can be employed in composition of the present invention are melt-processible thermoplastic materials characterized by ester linkages distributed among the main molecular chain. Preferably, the thermoplastic material employed is characterized as a partly aromatic polyester obtained from the polymerization reaction of aliphatic glycols and aromatic dicarboxylic acids or esters with partly aromatic polyesters selected from the group consisting of polybutylene terepthalate, polyethylene terepthalate and mixtures thereof being preferred. In the composition and process of the present invention, polyethylene terepthalate is the preferred polyester. Suitable polyester materials are commercially available from a wide variety of sources.

Ethylene vinyl alcohol materials suitable for use in the process an composition of the present invention are melt-processible thermoplastic copolymers of ethylene and vinyl alcohol having an ethylene content which is, preferably, between about 27% and about 32%. Examples of suitable commercially available material includes material produced by EVA/LA as well as from a wide variety of other commercial sources.

Suitable melt-processible polyamide thermoplastics are, preferably selected from the group consisting of Nylon 11, Nylon 12, Nylon 6 and mixtures thereof. Nylon 6 materials are polyamide thermoplastic materials derived from the condensation polymerization of caprolactam. Nylon 12 and Nylon 11 materials are respectively derived from the condensation reaction of either laurolactam or 11-aminoundecanoic acid.

In the process of the present invention, Nylon 6 is the preferred polyamide material. However it is within the purview of this invention to employ a polyamide material which is a multi-component system compromising a Nylon 6 copolymer blended with other nylons and/or olefinic materials. The preferred polyamide material, Nylon 6, generally has a melt-temperature between about 225° C. and about 290° C. with a temperature between about 220° C. and about 240° C. being preferred. Suitable Nylon 6 polyamide material is commercially available from various sources.

In the present invention the polymeric material can be either virgin polymer, regrind or a mixture of virgin and regrind materials having suitable characteristics of melt-processibility, extrudability and strength to be applied to the unbrazed metallic material with its overlayment of suitable brazing material prior to the brazing operation.

The polymeric material is optionally compounded with a suitable inert particulate material prior to application onto the surface to be brazed. The optional particulate material is one which is essentially inert and one which is capable of essentially uniform deposition on the exposed surface of the workpiece to be brazed. The inert material employed in the present invention preferably is selected from the group consisting of carbon, carbon black, and mixtures thereof. In the composition of the present invention, the suitable inert material can be incorporated into the polymeric substrate material by any conventional compounding method. When employed, the particulate material is employed at amounts sufficient to prevent agglomeration and run-off of the brazing material from the exposed surfaces of the workpiece. It is anticipated that particulate material in amounts up to and including about 20% by weight of the total polymeric material can be employed. Preferably an amount of particulate material between about 5% and about 20% is incorporated when the particulate material is employed. However amounts less than 5% can be effectively employed.

When it is desirable to provide the surface of the workpiece with enhanced heat absorptive qualities, preferably, the composition of the present invention is provided with black pigments to enhance the heat adsorptive characteristics by a "black body" effect. This can be provided by the incorporation of a suitable pigmentation agent, or, more preferably, the incorporation of a black particulate material such as carbon black. Carbon black material employed is, preferably, present as a very fine powder.

It is also within the purview of this invention, to provide a coating material for application on exposed surfaces of a suitable workpiece to be brazed which does not incorporate inert particulate material. It has been found that the application of a thin film of polymeric material overlying the exposed brazing alloy deposited on the metallic substrate of the workpiece to be brazed prior to brazing operations will prevent the agglomeration and run-off of the deposited brazing material as a result of the brazing operation. Without being bound to any theory, it is believed that the brazing operation results in pyrolysis of the polymeric coating leaving a thin residual carbon layer which alters the surface tension of the brazing material in its liquidus state sufficient to prevent the agglomeration and run-off phenomena.

In the process of the present invention, the polymeric material may be applied to the workpiece to be brazed by any suitable method. In the manufacture of materials such as double-wall tube, the polymeric coating is applied by any suitable method to formed, unbrazed tubing. Application may be by any suitable means which will provide an essentially uniform homogeneous coating. Examples of such methods include spraying, dipping, extrusion or the like. In processes such as those involved in the manufacture of double-wall tube, the polymeric coating is preferably applied by conventional cross-head extrusion operations.

The thickness of the polymeric coating layer overlaying the unbrazed workpiece is dependant on various factors such as the amount of carbon deposition required, concentration of the optional particulate material optionally present in the polymeric coating and the ease and efficiency with which the polymeric coating undergoes pyrolysis. The coating thickness is necessarily variable given the concentration of particulate material present or derivable from the polymeric coating. Further factor which influence coating thickness include the film forming characteristics of the polymeric material itself and the ability of the imparted coating to sustain and withstand normal handling during processing. Generally, thicknesses of the polymeric coating can be between about 25 and about 250 microns (about 0.001 inches and about 0.010 inches); with coating thicknesses between about 25 and about 150 microns (about 0.001 and about 0.006 inches) being preferred. In double-wall tubing manufacturing processes it is preferred that the coating have an average thickness between about 50 and about 75 microns (about 0.002 and about 0.003 inches).

Figure 1:
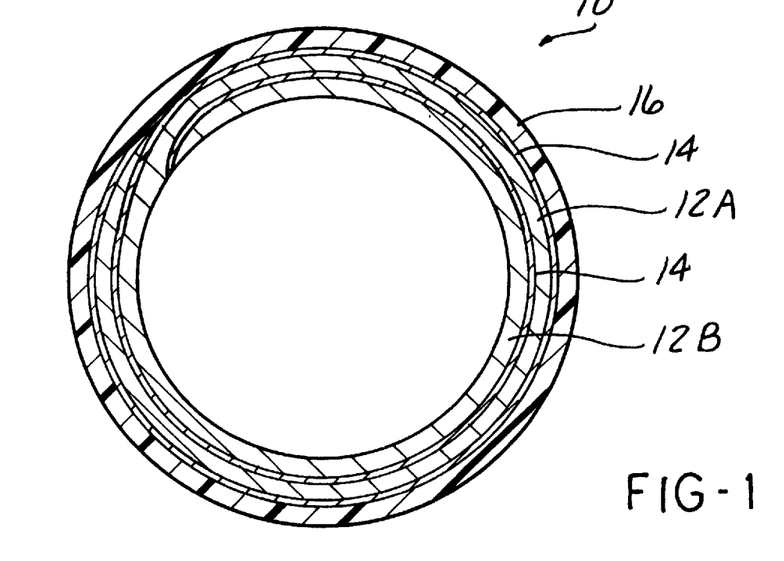
FIG. 1 is a cross-sectional view taken through the unsealed, unbrazed coated tube of the present invention.

The present invention also encompasses tubing stock having an outer polymeric coating consisting essentially of the polymeric material of the present invention. Such tubing 10, preferably, has a metal layer 12 disposed radially innermost. The metal employed can be any material which is formable and amenable to brazing processes. Examples of such material include, but are not limited to, low carbon steel, conventional carbon steel, various grades of stainless steel and the like as would be known to the skilled artisan.

In the preferred embodiment as shown in FIG. 1, the metal layer is actually composed of two metal sublayers 12a and 12*b* which are positioned in overlapping radial relationship to one another. Overlaying the exteriorly oriented surface of layers 12*a* and 12*b* is a layer 14 composed of a suitable brazing material. The brazing material is, preferably, imparted onto the surface of the metal layers 12*a* and 12*b* prior to final tubing formation.

The brazing material layer 14 is generally composed of a metal alloy capable of being uniformly deposited on the surface of metal sublayers 12*a* and 12*b*. Deposition may be by any suitable mechanical, chemical and/or electrochemical process which will permit permanent or, at the minimum, semi-permanent mechanical adhesion of the selected metal alloy to the underlying metal surface. The brazing material employed may be any suitable metal or alloy which can form an appropriate fusion bond with the underlying metal. Preferred brazing materials employed in the brazing material layer 14 include, but are not limited to, brazing materials such as alloys of copper, alloys of silver as well as non-alloyed metals such as copper, silver. Other suitable brazing materials capable of forming a fusion bond with the metallic substrate would be known to those skilled in the art.

As shown in FIG. 1, the brazing alloy material layer 14 is in overlying contacting relationship with the outwardly oriented surface of the respective metal layers 12*a*, 12*b*. The brazing material layer 14 can be attached to the metal layers 12*a*, 12*b* by any suitable mechanism such as electroplating, chemical deposition or the like.

Where the objective is the formation of sealed double-wall tubing, the brazing metal alloy is, preferably, deposited on the metal surface prior to the formation of the double wall tubing. The brazing metal layer 14 can be attached to the metal layers 12*a*, 12*b* by any suitable mechanism such as electroplating, chemical deposition or the like.

Where the objective is the formation of sealed double-wall tubing, the brazing metal alloy is, preferably, deposited on the metal surface prior to the formation of the double wall tubing. The metal with the brazing alloy thus deposited can be rolled and formed by any conventional method. An outer polymeric layer 16 overlies brazing metal layer 14 to completely enclose this surface. The thickness of the polymeric overlayer 16 is sufficient to provide a durable coating which can be handled and transferred with minimal risk to the structural integrity of the outer polymeric layer. In practice, the outer polymeric layer 16 has a thickness between about 25 and about 250 microns (about 0.001 inches and about 0.01 inches). Preferably, the thickness is between about 25 and about 150 microns (about 0.001 and about 0.006 inches) with an average thickness between about 50 and about 75 microns (about 0.002 and about 0.003 inches) being most preferred. Such material can be transferred into a suitable brazing environment in which the various multiple layers of metal can be fused to form a sealed double-wall tube.

Figure 2:
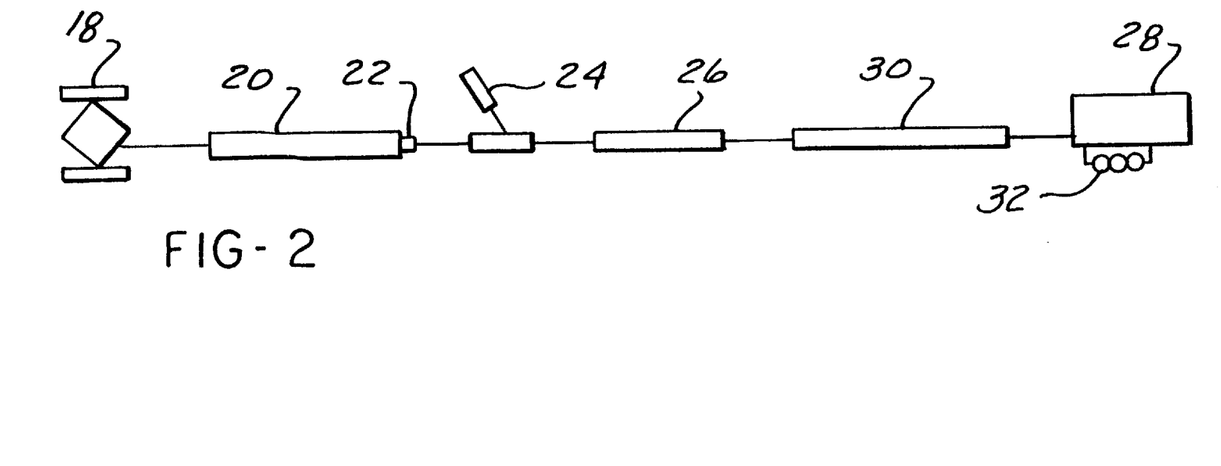
FIG. 2 is a schematic view of the process of the present invention.

In the process of the present invention, unbrazed material such as unsealed double-wall metal tube with a suitable brazing alloy imparted thereon can be prepared by any suitable method. In the preferred process, unsealed, uncoated double-wall tubing is prepared from metal in strip or sheet form. The metal, preferably, has a thickness between about 0.25 mm and 0.35 mm (about 0.010 and about 0.012 inch) and has a width suitable for producing a double-wall tube of an appropriate diameter. The length of the metal strip or sheet is determined by handling constraints and requirement needs. In the process as depicted in FIG. 2, the metal sheet or strip to be formed is advanced to suitable roll forming machines 20 which subsequently produce unbrazed, unsealed double-wall tubing. If necessary, the tubing can be immediately advanced to a volatilization station 16 which includes means for removing volatile portions of lubricating material employed during the roll forming steps (not shown).

The metal to be formed may be prepared with the selected brazing material prior to placement of such prepared feedstock in a suitable feed-storage device such as payoff reel such as reel 18. The metal may be formed into tubing by any suitable formation operations as would be known to those skilled in the art such as roller forming operations depicted in FIG. 2. After the tube is formed into suitable unsealed double-wall tubing, it is conveyed to the polymeric coating station 24 where a suitable polymeric coating is applied to the exterior of the unsealed double-wall tube. It is to be understood that the unsealed double-wall tube may be immediately conveyed to the polymeric coating station or can be stored and accumulated for later coating depending upon the processing conditions in the given paint or location.

As indicated previously, the polymeric coating may be applied by any of a number of methods which would be known to those skilled in the art of coating technology. Thus the polymeric coating station discussed in herein is taken to encompass any suitable means for applying polymeric coating to the exterior surface of the unsealed double-wall tubing. As depicted in FIG. 2, the polymeric coating station 24 is, preferably, a suitable conventional cross-head, extrusion mechanism with appropriate fixturing and conveying means as would be known to one reasonably skilled in the art.

The material imparted onto the outermost surface of the unsealed, unbrazed metal tube is, preferably, a polymeric material having a thickness sufficient to permit handling of the coated tube during subsequent processing steps without compromising the structural integrity of the overlaying polymeric film. The thickness of the polymeric material is between about 25 and about 250 microns (0.001 inches and about 0.010 inches), with an average thickness between about 50 and about 150 microns (about 0.002 to about 0.006 inches) being preferred. It is to be understood that the polymeric material applied to the exterior surface of the unsealed tubing is, preferably applied in its molten or liquid form, i.e. at or near its particular melt processing temperature.

Upon exiting the polymeric coating station 24, the applied polymeric material is permitted to cool in a suitable cooling station 26 to permit the complete solidification of the polymeric film and its suitable adherence on the outer surface of the unsealed metal tubing.

The coated unsealed tube can be conveyed as required to an appropriate brazing furnace 28. As employed herein the term "brazing furnace" is defined as any suitable device by which unsealed tubing of the type described herein can be brought to an appropriate temperature in an appropriate environment for an interval sufficient to achieve appropriate brazing. Such brazing furnaces include, but are not limited to conventional or modified muffle furnaces, induction-type furnaces and the like. In the embodiment described herein, a muffle furnace is effectively employed.

Brazing furnace 28 includes means for raising the surface temperature of the tube to an elevated temperature sufficient to vaporize the polymeric material in the initial stages of the brazing operation. The elevated temperature employed in the muffle furnace 28 is one sufficient to trigger fusion between the metal surfaces and the selected brazing metals overlaying thereon. The muffle furnace also includes means for providing a suitable dry gaseous atmosphere within the furnace itself. The gas preferably employed is composed of a nitrogen atmosphere with sufficient hydrogen to achieve and maintain fluxing. In the preferred embodiment the gas is dry. The gas can be supplied by any conventional manner such as from gas bank 32 shown in FIG. 2.

Upon exiting the brazing furnace 28, the metal tube has been fused into a leak-proof, double-wall material. At this point, it can be conveyed to appropriate post brazing steps such as suitable cool down and any suitable post-forming processes.

In the process of the present invention, a metallic material having an outwardly oriented surface overlayed with a suitable metallic brazing material or alloy and coated with a melt-processible extrudable polymeric material is subjected to an elevated temperature sufficient to trigger fusion between the metallic brazing material or alloy and the underlying metallic material to be brazed. The term fusion as used herein is defined as the existence or establishment of a metallurgical bond between two dissimilar metals; i.e. the metallic material and the metallic brazing material or alloy. The elevated temperature to which the surface of the underlying metallic material is elevated is a temperature which is sufficiently higher than the liquidus temperature of the brazing material or alloy imparted on the metallic material to trigger and maintain the fusion process. "Liquidus temperature" is defined herein as the temperature at which a metal or metal alloy begins to enter the molten state. In the preferred embodiment, where copper is employed, the liquidus temperature of copper is 1083° C. (1,981° F.). Preferably, the elevated temperature is at or above a temperature between 1093° C. and 1121° C. (2,000° and 2,050° F.). The upper maximum for the elevated temperature is determined by both the properties of the underlying metallic material substrate and the selected brazing material employed. Ideally, the upper temperature is limited to a point below thermal degradation or melting point of the metallic material substrate and/or the degradation point of the selected brazing material.

In the process of the present invention, metallurgical fusion occurs in an atmosphere which will support fluxing. Suitable atmospheres include reducing atmospheres as well as exothermic gaseous atmospheres. In the preferred embodiment, the atmosphere for supporting fluxing is an exothermic atmosphere formed by partial combustion of a mixture of air and natural gas (methane) in a ratio of between about 4:1 to about 8:1 air to natural gas respectively; with an air to natural gas ratio of about 4:1 being preferred. The generated gas preferably has a controlled dew point. The exothermic fluxing gas employed, preferably provides an atmosphere in the fluxing environment which consists essentially of an anhydrous gas selected from the group consisting of nitrogen, hydrogen, carbon dioxide, carbon monoxide, and mixtures thereof.

The atmosphere employed and the temperatures attained in the brazing process of the present invention permit and promote the volatilization of the polymeric material employed in outer layer 16. As used herein, the term "volatilization" is defined as the forced vaporization and evaporation of the polymeric material employed in the outer layer 16 accompanied by the generation of volatilization products which are typically simple organic and inorganic molecule together with elemental carbon.

The material to be brazed is conveyed through the brazing furnace at a rate sufficient to achieve effective brazing. Typically in brazing operation involving double-wall tubing, the unsealed coated tubing will be conveyed through the furnace at a rate sufficient to achieve appropriate brazing.

Conveyance into the brazing furnace environment causes a rise in temperature of the coated metal to be fused. It is during this initial rise in temperature that the polymeric material employed in the outer layer 16 is volatilized. Preferably volatilization of the polymeric material employed in the outer layer 16 is essentially instantaneous such that the volatilization of the polymeric material occurs in the initial phase of the brazing process before the brazing material or alloy has achieved its liquidus temperature.

Upon volatilization, a thin powder residue remains and adheres to the outer surface of the tubing to be brazed. Without being bond to any theory, it is believed that the residue consists essentially of elemental carbon; the volatilized hydrocarbon components of the polymeric material having either been consumed in the fluxing atmosphere or conveyed away from the tubing surface due to the relative movements of the fluxing gas and the tubing undergoing the brazing operation.

It has been found that tubing prepared with the polymeric coating of the present invention does not experience the agglomeration and run off phenomenon found in untreated tubing overlayer with a brazing material. Without being bound to any theory, it is believed that this is due to changes in surface tension of the molten brazing alloy caused by the presence of the carbon powder. This beneficial aspect is attained even when the polymeric coating material is not compounded with additional carbon material. Without being bound to any theory, it is believed that the volatilization of the polymeric material results in the complete volatilization of sufficient amounts of the polymeric material to elemental compound residue to provide sufficient carbon film to prevent agglomeration and run-off.

Having disclosed and discussed the forgoing invention, the following examples are included to further illustrate and demonstrate the present invention. The Examples are included for illustrative purposes and are not to be construed as limitative of the invention.

EXAMPLE I

The effects of pyrolysis of various polymeric compounds in a standard air atmosphere was investigated to determine the efficiency of the volatilization process and the breakdown products produced thereby. In all, six samples of various polymeric compounds were each compounded with 20% by weight carbon black. Samples of each resulting material were subjected to pyrolysis in either an inert helium atmosphere or a standard air atmosphere to ascertain the pyrolysis products derived therefrom. Direct pyrolysis products were determined by thermogravimetry with on-line mass-spectrometry (TG/MS) using inert helium gas and a nominal heating rate of 30° C./minute to 880° C. These products and additional potential products of incomplete combustion (PIC) were further determined using laser pyrolysis/gas chromatography/mass-spectrometry(LPy-GC/MS) which involved very rapid surface heating to temperatures of 1,000° C. or higher with a 50 or 100 msec pulse from a carbon dioxide laser in ambient air. The laser technique examined the secondary reaction products formed at high heating rates or in the highly reactive atmosphere of the flame. The TG/MS technique further indicates the temperatures at which decomposition takes place and the amount of residue left from simple (inert atmosphere) pyrolysis.

The results summarized in Table II include the temperature of the maximum weight of sample weight loss (max DTG), the approximate percent residue, the main TG pyrolysis products and the main laser pyrolysis products.

The materials analyzed are as follows:

Sample 1.—Nylon 6 with 20% carbon black (CAPRON I4094; Cabot monarch 120)

Sample 2.—Low density polyethylene with 20% carbon black (recycled polyethylene derived from industrial processes; Cabot monarch 120);

Sample 3.—Acetal (POM) with 20% carbon black (DELRIN 500; Cabot monarch 120);

Sample 4.—Low density polyethylene with 20% carbon black; polyethylene terepthalate with 20% carbon black (TIGER MB, lot J 3466; Cabot monarch 120);

Sample 5.—Nylon 6 with 20% carbon black (AP20BK, lot AV1403-0895; Cabot monarch 120).

As illustrated in the data collected in Table II, the temperature of the maximum rate of sample weight loss (max DTG) is well below the liquidus temperature for conventional brazing metals or alloys such as copper. Thus, it can be assumed that the volatilization of the organic components due to pyrolysis occurs sequentially before the brazing material achieves its liquidus state.

The approximate percent residue indicates that materials such as polyethylene and polyethylene terepthalate actually produce reside in excess of the amount contributed by the carbon black as would be expected. It is hypothesized that this additional residue is actually a result of the pyrolysis of the polymeric material. Such residue may assist in preventing agglomeration and run-off of brazing material during subsequent brazing processes.

The thermogravometric pyrolysis products resulting from pyrolysis in an inert helium atmosphere are set forth in Table II.

The laser pyrolysis products which were produced in air indicate more complex molecular structures as would be expected due to reaction with atmospheric oxygen.

EXAMPLE II

Unsealed 3/16 inch diameter double wall steel tube having an overlaying copper brazing material was coated with a thin film virgin extrusion-grade polyethylene compounded with 20% carbon black at an average thickness between about 0.002 and 0.003 inches applied by a conventional cross-head extrusion device. The coating was allowed to cool and was then fed to a conventional brazing furnace where the material was brazed at 2050° F. at a furnace speed of 9 feet per minute in a brazing atmosphere.

The resulting sealed double-wall tube was inspected after cooling. A visual inspection indicated a thin film of carbon dust-like material covering the exterior surface of the tube. The tubing was subjected to conventional industrial tests to determine its grade designation. The quality of the resulting tubing was found to be equal to or better than that prepared by conventional black paint processes. Visual inspection of the exterior surface of the tubing indicated no appreciable evidence of agglomeration or run-off of the copper brazing material. This indicates that employing the coating material of the present invention on unbrazed, double-wall tubing as a substitute for black paint provides an acceptable level of conforming parts.

EXAMPLE III

Unsealed tubing was prepared according to the process outlined in Example II. The polymeric coating material employed was extrusion grade virgin polyethylene containing 10% by weight carbon black. The resulting coated unsealed tubes were brazed in the manner described previously. The resulting sealed tubes were inspected and found to be of a quality equal to or better than that achieved by conventional black paint processes. Visual inspection of the exterior of the tubing showed no appreciable evidence of agglomeration or run-off of the copper brazing material. The visual inspection further indicated a thin film of an inert particulate material which was determined to be carbon dust.

EXAMPLE IV

Unsealed double-wall tubing having an intermediate bonding layer composed of copper was prepared by conventional processes. The tubing was coated with a film of virgin extrusion grade polyethylene by a cross-head extrusion method to an average thickness between 0.002 and 0.003 inches. The coated tubing was allowed to cool and then was fed into a suitable brazing furnace having a controlled exothermic atmosphere at a temperature of 2050° F. and a furnace speed of 9 to 11 feet per minute.

The resulting brazed tube was allowed to cool and was visually inspected. A thin film of dust was found to cover the exterior of the tube. No appreciable evidence of copper agglomeration or run-off was detected. Further performance tests were performed to determine that effectiveness of the brazing process. The resulting tubing was found to be of a quality equal to or superior to tubing produced by conventional black paint processes.

This indicates that application of polymeric materials in the film coating does not interfere with the brazing process. The thin coating film appears to undergo an essentially complete thermal paralytic volatilization and/or decomposition with no organic carbonaceous residue on the tubing surface. Residue would appear to be essentially particulate carbon. Application of polymeric coating, even material which is not compounded with additional particulate carbon, can effectively reduce or eliminate agglomeration and run-off surface brazing material.

TABLE II

Summary of Results

| Samp No. | Polymer | Temp. Max. DTG (approx) | Residue (approx %) | TG Pyrolysis Products (in He) | Laser Pyrolysis Products (in air) |
| --- | --- | --- | --- | --- | --- |
| 1 | Nylon 6 | 480 | 20 | caprolactam (cyclic monomer) (formaldehyde)* | caprolactam alkybenzenes (Co—C2) (pyridine)* other polymer fragments |
| 2 | LDPE | 510 | 25 | alkenes (C2 to —C30) | alkenes (~C5 to —C12) |

TABLE II-continued

Summary of Results

| Samp No. | Polymer | Temp. Max. DTG (approx) | Residue (approx %) | TG Pyrolysis Products (in He) | Laser Pyrolysis Products (in air) |
|---|---|---|---|---|---|
| | | | | alkanes (≈C4—) | alkanes (≈C7—C12) |
| | | | | alkadienes (≈C6—) | alkadienes (≈C6—C12) |
| | | | | alkylbenzenes (trace C1—C2) | alkylbenzenes (C0—C2) |
| | | | | | phenylacetylene |
| | | | | | styrene |
| 3 | Acetal | 350 | 20 | formaldehyde | hydroxyacetal (+/or |
| | | | | hydroxyacetal (+/or | hydroxyethyleneoxide) |
| | | | | hydroxyethyleneoxide) | |
| 4 | LDPE | 510 | 40 | alkenes (C2 to ≈C30) | same as No. 2 |
| | | | | alkanes (=C4—) | |
| | | | | alkadienes (≈C6—) | |
| | | | | alkylbenzenes (trace C0—C3) | |
| | | | | (alkyl-)styrenes + indenes | |
| 5 | PET | 470 | 30 | terephthalic acid | alkylbenzenese (C0—C2) |
| | | | | benzoic acid | phenylacetylene |
| | | | | ethylene | styrene |
| | | | | CO2 +/or ehtyleneoxide | benzoic acid |
| | | | | dimer + trimer | phenyl-aldehydes + |
| | | | | | -ketones |
| 6 | Nylon 6 | 470 | 20 | same as No. 1 | same as No. 1 |

*Tentatively identified compounds.

What is claimed is:

1. A process for brazing a workpiece, the workpiece being composed of:
   metallic substrate material having at least one exposed outer surface;
   metallic brazing material overlaying and adhering to the outer surface metallic substrate material the metallic brazing material having a liquidus temperature, the metallic brazing material capable of forming a fusion bond with the metallic substrate material, wherein at least a portion of the metallic brazing material is located on the exposed outer surface of the metallic substrate material; and
   an essentially solid polymeric material overlaying and in contact with at least a portion of the metallic brazing material located on the exposed outer surface, the polymeric material consisting essentially of:
   a) an extrudable melt-processible thermoplastic material capable of undergoing pyrolysis at a temperature below the liquidus temperature of the metallic brazing material, the extrudable melt-processible thermoplastic selected from the group consisting of polyethylene, polypropylene, acetal resins, ethylene vinyl alcohol, nylon, and mixtures thereof; and
   b) between about 0 and about 20% by weight, based on the thermoplastic material, of an inert particulate material selected from the group consisting of carbon, carbon black and mixtures thereof capable of at deposition on and adherence to the second metallic brazing material, wherein the process comprises the steps of:
   raising the temperature of the workpiece to an elevated temperature sufficient to initiate pyrolysis of the polymeric material overlying the metallic brazing and to attain the liquidus temperature of the overlying metallic brazing material, the temperature raising step occurring in a controlled gaseous atmosphere capable of maintaining achieving and maintaining fluxing; and
   maintaining the workpiece in contact with the controlled gaseous atmosphere at the elevated temperature for an interval sufficient to permit fusion between the metallic brazing material and the metallic substrate material and yield volatilized pyrolysis products of the polymeric material; and
   consuming at least a portion of the volatilized pyrolysis products of the polymeric material in the controlled gaseous atmosphere.

2. The process of claim 1 wherein the workpiece is an unsealed tube having an outer circumferential area, at least two layers of the metallic substrate material, an intermediate layer composed of metallic brazing material interposed between the metallic substrate material layers and a layer of brazing material overlaying the outer circumferential area, and wherein the polymeric material overlies the outer circumferential area of the unsealed tubing.

3. The process of claim 2 wherein the melt-processible material employed in the polymeric material is selected from the group consisting of polyethylene, acetal resins, nylon and mixtures thereof.

4. The process of claim 3 wherein the metallic substrate material is selected from the group consisting of carbon steel, stainless steel and mixtures thereof and the metallic brazing material is selected from the group consisting of copper, alloys of copper, silver, alloys of silver and mixtures thereof.

5. The process of claim 3 wherein the polymeric material has an average thickness less than about 0.001 inches.

6. A process for brazing a workpiece composed of a metallic substrate material having at least one exposed surface region having a metallic brazing material having a liquidus temperature, the metallic brazing material positioned in overlying relationship to the metallic substrate material, wherein the metallic brazing material overlies the exposed surface region defined in the substrate material, the process comprising the steps of:
   applying a thin film of a liquid, molten polymeric material into adhering contact with the exposed surface region of the metallic substrate material such that the metallic brazing material is interposed between the metallic substrate material and the applied polymeric coating;

allowing the liquid polymeric material to cool and solidify on the exposed surface region;

raising the temperature of the metallic substrate material to a first elevated temperature sufficient to initiate pyrolysis of the polymeric material and generation of volatilized pyrolysis products and a pyrolytic by-product consisting of a non-reactive particulate residue overlying the metallic brazing material, in contact with an anhydrous exothermic gaseous atmosphere;

further raising the temperature of the metallic substrate material to a second elevated temperature, the second elevated temperature sufficient to attain the liquidus temperature of the brazing material, the temperature raising steps occurring in a controlled gaseous atmosphere capable of achieving and maintaining fluxing; and maintaining the metallic substrate material in contact with the anhydrous exothermic gaseous atmosphere at the second elevated temperature for an interval sufficient to permit fusion between the metallic brazing material and the metallic substrate material and to consume at least a portion of the volatilized pyrolysis products of the polymeric material.

7. The process of claim 6 wherein the anhydrous gaseous atmosphere comprises at least one non-reactive carrier gas and sufficient hydrogen to achieve and maintain fluxing.

8. The process of claim 7 wherein the anhydrous gaseous atmosphere further comprises a gas selected from the group consisting of carbon dioxide, carbon monoxide, and mixtures thereof.

9. The process of claim 6 wherein the polymeric material application step comprises extruding the liquid polymeric material in a thin film from a suitable extrusion device into adhering contact with the exposed surface of the metallic substrate material said metallic substrate material having a temperature less than the temperature of the extruded liquid polymeric material.

10. The process of claim 9 wherein the polymeric material is a melt-processible thermoplastic selected from the group consisting of polyethylene, polypropylene, acetal resins, ethylene vinyl alcohol, nylons, polyesters and mixtures thereof.

11. The process of claim 9 wherein the workpiece is a double-wall tube and the polymeric material is applied at a thickness between about 0.001 and about 0.010 inches on an exteriorly oriented surface.

12. The process of claim 11 wherein the polymeric material is applied at a thickness between about 0.002 and about 0.003 inches.

13. A process of producing a brazed double-wall tube comprising the steps of:

sequentially forming an unbrazed unsealed tube of an exterior circumference from an elongated sheet composed of a metallic substrate material, the sheet having at least one surface with a brazing metal in overlying relationship thereto;

applying a liquid film of polymeric material to the exterior circumference of the unbrazed, unsealed tube, the polymeric material being a melt-processible thermoplastic material selected from the group consisting of acetal resins, nylon, polyesters, ethylene vinyl alcohol, and mixture thereof;

allowing the liquid extruded polymeric material to cool and solidify on the exterior circumference;

raising the surface temperature of the unbrazed, unsealed tube to a first elevated temperature sufficient to trigger pyrolysis of the applied polymeric material, and production of volatilized pyrolysis products and a non-reactive particulate film overlaying the exterior circumference;

further raising the temperature of the unbrazed, unsealed tube to a second elevated temperature sufficient to trigger fusion between the brazing metal and the metallic substrate material and consumption of at least a portion of the volatilized pyrolysis products, the temperature elevation steps occurring in a controlled gaseous atmosphere.

14. The process of claim 13 wherein the controlled gaseous atmosphere is an anhydrous exothermic gaseous atmosphere consisting of at least one essentially non-reactive carrier gas and sufficient hydrogen to achieve and maintain fluxing, maintaining the tube in contact with the anhydrous exothermic gaseous atmosphere for an interval sufficient to permit fusion between the brazing material and the metallic substrate material to form a fused leak proof double wall tube having an exterior surface on which the brazing metal is uniformly deposited.

* * * * *